Nov. 22, 1960 M. A. MAGNUSON 2,961,655
SYNTHETIC RADAR TARGET GENERATOR
Filed June 19, 1957 2 Sheets-Sheet 1

INVENTOR.
MAGNUS A. MAGNUSON
BY George Sipkin
George E. Pearson
ATTORNEYS

Nov. 22, 1960  M. A. MAGNUSON  2,961,655
SYNTHETIC RADAR TARGET GENERATOR
Filed June 19, 1957  2 Sheets-Sheet 2
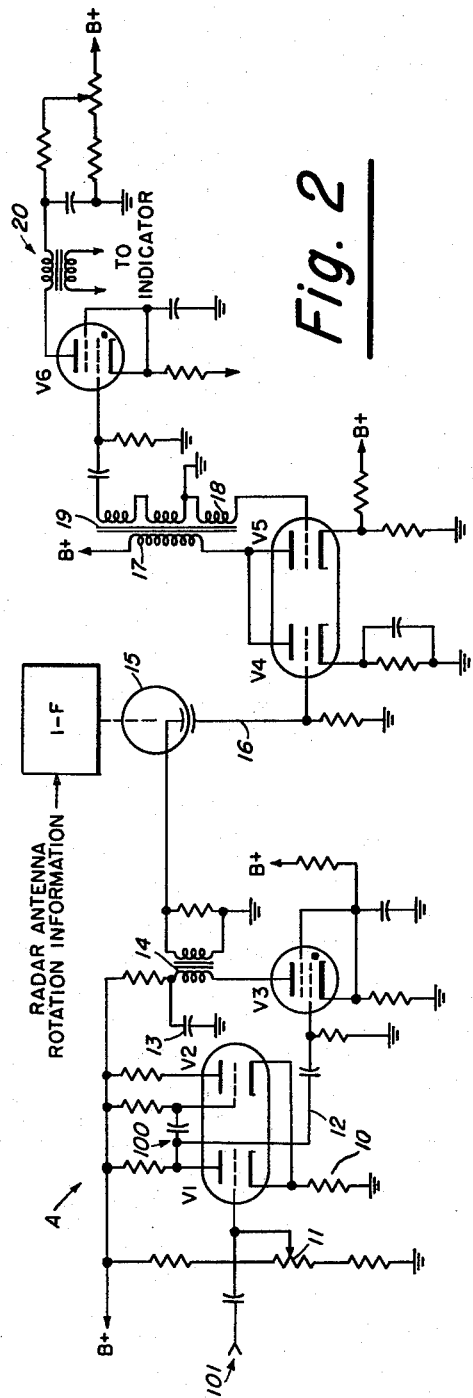
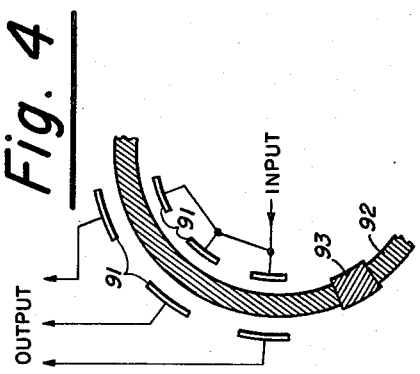
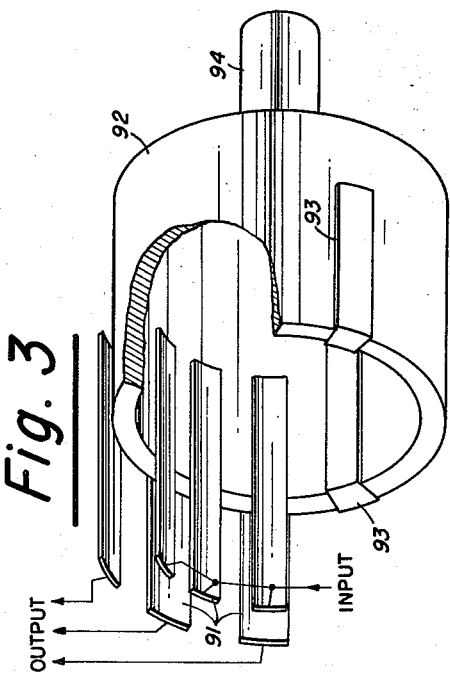
INVENTOR.
MAGNUS A. MAGNUSON
ATTORNEYS United States Patent Office 2,961,655
Patented Nov. 22, 1960

2,961,655

SYNTHETIC RADAR TARGET GENERATOR

Magnus A. Magnuson, San Diego, Calif., assignor to the United States of America as represented by the Secretary of the Navy Filed June 19, 1957, Ser. No. 666,791

7 Claims. (Cl. 343—17.7)

(Granted under Title 35, U.S. Code (1952), sec. 266)

The invention described herein may be manufactured and used by or for the Government of the United States of America for governmental purposes without the payment of any royalties thereon or therefor.

This invention relates to a synthetic radar target generator and more particularly to a synthetic echo pulse generating circuit for generating echo signals. These signals when applied to a radar indicator will cause to be displayed thereon an indication which characterizes a normal desired target. This invention has particular value in applying synthetic targets to a radar plan-position indicator, however, its features may be applied to any of the known radar indicators which illustrate range and bearing. The voltages which are generated by the invention are controllable; it is thus possible for the radar operator to obtain a quantitative measure of the performance of the indicator and in turn it is also possible to obtain a quantitative measure of the operator's proficiency.

Radar object detection consists of a system of detection which utilizes the property of reflection of electromagnetic energy from objects encountered in its propagation through space. In a pulse-echo type of radar system, short pulses of radio energy are transmitted from the radar equipment and are received after reflection from an object. The reflected pulses are indicated on a calibrated indicator which establishes the distance to the object from the transmitter and receiver and generally the object's bearing relative thereto.

In systems of this type, detection of the presence of a target and an illustration of its exact location is dependent upon the proper operation and calibration of the indicator as well as the proficiency of the operator. Obviously, if the indicator is not functioning properly or in proper calibration, or if the operator does not operate the indicator correctly, the correct range and position of a target will not be registered on the indicator.

The old method of calibrating or making adjustments upon radar indicators requires that authentic radar data be employed. In using this old method, provision for a direct quantitative measure of equipment and operator performance is not feasible because the old method does not assure that the inexperienced operator will effect optimum adjustments of radar indicators. This is due to the multiplicity of factors involved when using raw radar data. Further, the old method is time consuming when it is most urgent that initial indicator adjustments be completed.

This invention provides an aid that is especially desirable for the inexperienced operator in adjusting a radar indicator of the plan-position type for initial operation. It accomplishes this by allowing the operator to make initial adjustments independently of any operational parent radar equipment. The invention also permits the operator to make initial adjustments to the indicator immediately after the turning on of the equipment which had been shut down. Usually a considerable amount of time is normally required in making early adjustments of radar equipment which has been shut down when only authentic radar data is used. Further, the invention provides a quantitative check upon the radar indicator, which can be used to recognize by measurement of degraded performance the possibility of equipment failures. This latter feature is made possible by the novel circuit arrangement which controls the amplitude of the synthetic target pulse to a high order of precision.

An object of the present invention is the provision of an improved apparatus for generating a simulated radar target echo pulse.

Another object is to provide apparatus for generating a simulated radar target echo pulse having controlled range and azimuthal intelligence.

A further object of the present invention is the provision of apparatus for quantitatively measuring the performance of a radar indicator.

Another object is to provide apparatus that obtains a quantitative measure of a radar operator's proficiency.

A further object of the invention is the provision of quick means for making accurate initial radar indicator adjustments.

Still another object is to provide apparatus for generating simulated radar target echo pulses whose voltage amplitudes are critically controlled.

A still further object is the provision of a gas tube circuit which produces precise voltage amplitude control.

Also another object is to provide apparatus for selective electrical switching that utilizes changes in electrical capacitance.

Also a further object is to provide electrical switching apparatus which simulates azimuthal coverage of a radar antenna and has very low torque requirements.

The exact nature of this invention as well as other objects and advantages thereof will be readily apparent from consideration of the following specification relating to the annexed drawing in which:

Fig. 2 is a circuit diagram of the echo pulse generating circuit;

Fig. 3 shows a perspective view, partly in section, of a preferred embodiment of the azimuth gate; and Fig. 4 illustrates a partial sectional view of the azimuth gate shown in Fig. 3.

Similar reference characters refer to similar parts in each of the views.

Figure 1:
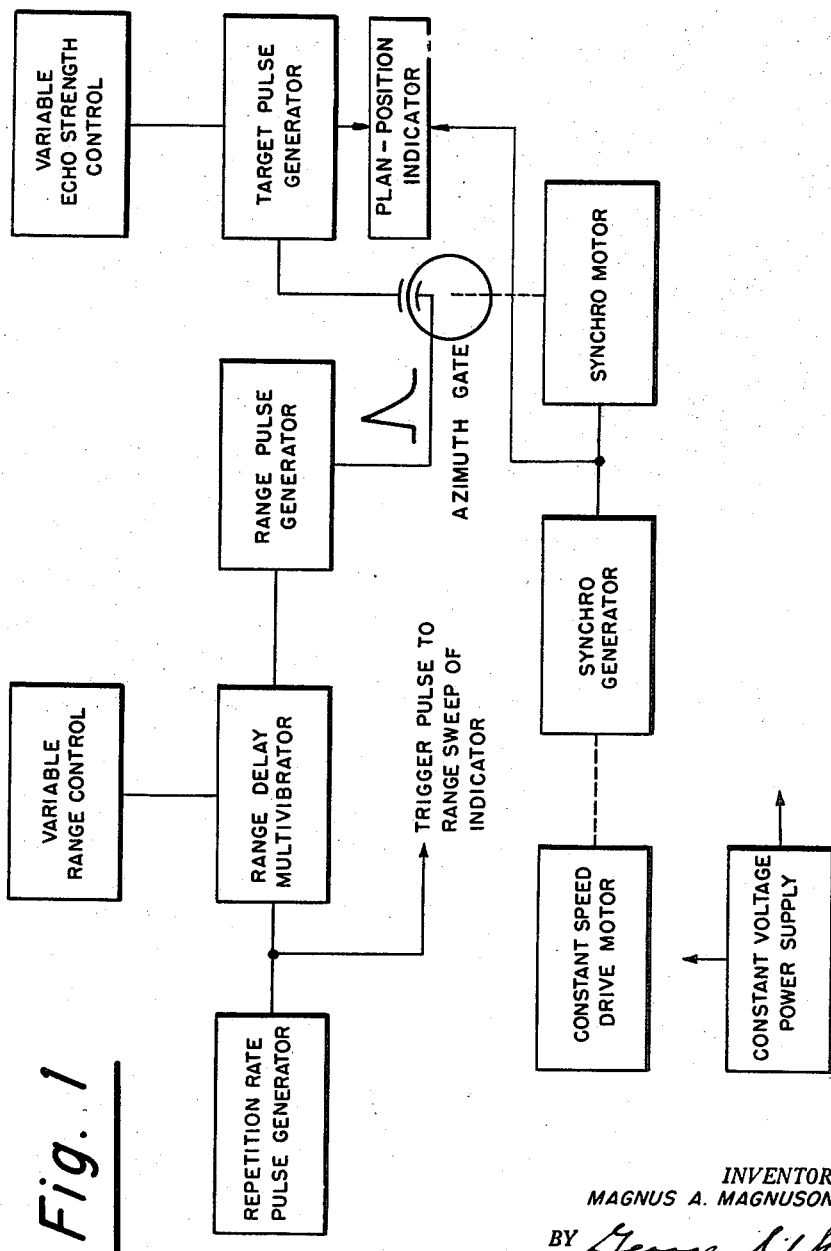
Fig. 1 is a block diagram of one embodiment of this invention.

Referring to Fig. 1, a block diagram illustrates the components of the invention in their functional arrangement. In practicing the invention, action is initiated in the block labeled repetition rate pulse generator. The generator is of conventional design comprising a blocking oscillator which generates spiked pulses at a predetermined rate. The generated pulses are fed simultaneously to the range delay circuit and to the radar indicator. The pulses to the radar indicator trigger the range sweep of the radar indicator.

The triggering pulse to the echo pulse generating circuit, which includes the rest of the in line blocks in Fig. 1, is of positive polarity and initiates operation of the normally inactive range delay multivibrator circuit. The range-delay circuit includes a variable range control for providing an output pulse to the range delay multivibrator that is selectively delayed in time relative to the synchronized triggering pulses to the range sweep of the indicator. Through operation of the range control, a synthetic echo signal can be positioned on the indicator having the range of a simulated target. The variable range control has lineal control characteristics and as the range on the indicator is also lineal, the indicia on the range control dial are easily correlated with a desired change in range on the indicator. Thus the output pulse of the range delay multivibrator circuit has impressed thereon a delay in time, giving the pulse range intelligence.

The output pulse of the range-delay multivibrator circuit triggers the range pulse generator. The range pulse generator comprises a unit circuit means including a gas tube circuit for generating a pulse with a prescribed wave-shape characterized by having a leading edge with an exceedingly steep voltage gradient. The range pulse is fed to an azimuth gate, the structure of which will be explained in detail later. The gate broadly consists of an arrangement of switching capacitors that selectively pass echo pulses to the target pulse generator in a manner that the pulses passed have bearing or azimuthal intelligence. The switching capacitors function as differentiating circuits, thus the amplitude voltage of the pulse to the target pulse generator is dependent upon the rate of change of the input voltage to the gate. Due to inherent losses in the gate, it is desirable to utilize the steep voltage gradient on the leading edge of the input waveform to ensure an adequate voltage amplitude to the target pulse generator.

The purpose of the azimuth gate is to simulate the positions of a rotating radar antenna. The capacitor switches are so deployed that they pass pulses at a predetermined azimuthal coverage to simulate an actual antenna coverage. Thus the bearings of a simulated target on the indicator can be preestablished with accuracy through the use of the azimuth gate. This applies either to single targets or multiple targets, as the number of targets to be simulated having different bearings are dependent only upon the number of capacitor switches used in the azimuth gate.

The azimuth gate comprises a novel means for switching an A.-C. voltage as a function of a shaft position. This is accomplished by apparatus which acts to change the value of electrical capacitance of a switching capacitor by the mechanical rotation of a shaft. With reference to Fig. 3, a metal sleeve is secured to shaft 94 and is grounded electrically. There is inserted into the wall of the sleeve a material 93 having a high dielectric constant such as barium-titanate or other materials having similar characteristics. Electrodes 91 straddle, but do not touch, the circumferential wall portion of the sleeve. Shaft 94 and sleeve 92 can be rotated in any desirable manner. However, it is a feature of this rotary capacitor switching arrangement that only a very low torque is required to turn the shaft as there is no contact between the switching elements. Thus a motor characterized by having low torque at low speeds may be used, for example, a synchro motor as used in the specific embodiment. In operation, the electrical capacitance between a given pair of electrodes 91 will increase during such time as the dielectric material insert 93 occupies the position between the two electrodes. During this period of time an applied electrical voltage of pulse form supplied to the input electrode of each pair of electrodes 91 is effectively switched to the output electrode due to the increase in the capacitive effect between the input and output electrodes. This action occurs for each successive pair of electrodes as the shaft is rotated, and the effective switching of each pair of electrodes can be considered substantially independent of the shaft speed from zero to maximum motor speed.

This arrangement for obtaining azimuth gating has distinct advantages over the use of vacuum tube circuitry, electrical bridge systems, mechanical switching arrangements or the like, in that it has simplicity, reliability, rugged construction and demands little torque for its operation.

The means for driving the rotor of the azimuth gate includes a constant speed motor for turning the shaft of a synchro-generator at a speed comparable to an average radar antenna azimuthal scanning rate. Electrical rotational informtion from the synchro-generator is applied to the synchro-motor and the motor rotates the azimuth gate rotor at a simulated scanning rate. The rotational information is also available for external use and may be applied to the radar indicator in the normal manner.

With reference again to Fig. 1, the gated range pulses trigger the target pulse generator which comprises a blocking oscillator circuit and a gas tube. The blocking oscillator is triggered first and in turn supplies triggering pulses to the gas tube. A control means, designated echo-strength control, is provided in the gas tube's plate circuit to provide control of the amplitude of the output target pulse to a high order of precision. The desired pulse waveform is illustrated in Fig. 1 and has a receding slope that is one-half that of the ascending slope.

The details of the echo generating circuit are shown in Fig. 2, reference being made thereto. The circuit generally indicated at A is the range delay multivibrator circuit. The normally inactive multivibrator 100 may be of conventional form and is triggered by positive synchronizing signals applied to terminal 101, which are signals from the repetition rate pulse generator. Under static conditions tube $V_2$ is conducting and tube $V_1$ is substantially non-conducting. The triggering pulse 101 causes tube $V_1$ to conduct and tube $V_2$ to be non-conducting for a period of time dependent upon tube $V_2$'s prior static cathode potential, which is determined by the voltage drop across resistor 10. This static cathode potential may be varied by changing tube $V_1$'s bias through variable resistor 11, which is the variable range control. This action causes a change in the cathode current flow of tube $V_1$ and concurrently a change in the voltage drop across cathode resistor 10, and in turn changes the static cathode potential on tube $V_2$. The output of multivibrator 100 is taken off by line 12 and impressed upon the grid of gas tube $V_3$. Upon tube $V_1$ being driven to a non-conducting condition by tube $V_2$, the negative bias on tube $V_3$ is decreased to a point where tube $V_3$ fires creating a short circuit to ground for a stored charge on capacitor 13. The discharge of capacitor 13 through transformer 14 generates an output pulse to the azimuth gate 15 which is characterized by an exceedingly steep voltage gradient.

The output pulse from the range pulse generator is differentiated through the distributing capacitor of the azimuth gate and impressed upon the grid of triode $V_4$ in the target pulse generator circuit through line 16. Triodes $V_4$ and $V_5$ comprise a blocking oscillator circuit of which triode $V_4$ is the trigger and triode $V_5$ is the blocking oscillator. In its operation, the pulse from the azimuth gate 15 causes $V_4$ to conduct, and the resulting current increase in winding 17 and thus winding 18 is such as to cause triode $V_5$ to also conduct. Triode $V_5$ has a regenerative effect inasmuch as its output adds to that of tride $V_4$. The total resultant current in winding 17 will reach a maximum whereupon the two triodes cease to conduct and flux lines in transformer 19 will decay naturally.

The resultant pulse from transformer 19, fires gas tube $V_6$. When tube $V_6$ conducts, its ionization plate potential will rapidly fall to a potential which no longer supports its ionization, due to voltage drops across impedances in its plate circuit. The voltage amplitude of the output pulse from transformer 20, due to the firing of tube $V_6$, is determined by the amount of voltage spread between the ionization plate voltage of the gas tube $V_6$ and its extinguishing plate voltage. The extinguishing voltage of the tube is of a constant value while the ionization plate voltage is preset at a desired value by variable resistor 21, which forms a potentiometer control across a constant voltage power supply. The control for the potentiometer 21 is the echo strength control and has a calibrated dial for critically controlling the amplitude of the output voltage to the indicator. With this arrangement it is possible to control the amplitude of the output pulse on the input side of transformer 20 which is the most desirable place to exercise such a control. The extinguishing voltage is of such a low value compared to the ionization plate voltage that a given percentage variation in the extinguishing voltage amounts to a very small fraction of the ionization plate voltage. Thus in this manner the amplitude of the output pulse from transformer 20 to the indicator is rendered practically independent of normal circuit variations and voltage drops that may occur to affect the value of the extinguishing voltage. Thus its amplitude can be precisely controlled.

Coupling transformer 20 is employed in the plate circuit of the gas tube for impedance matching and polarity reversal. The output impedance of the transformer is sufficiently low to properly feed any radar indicator.

Obviously many modifications and variations of the present invention are possible in the light of the above teachings. It is therefore to be understood that within the scope of the appended claims the invention may be practiced otherwise than as specifically described.

What is claimed is:

1. In combination, a synthetic echo pulse generating circuit and a radar indicator having an azimuthal sweep and a range sweep, means for recurrently supplying triggering pulses to said echo pulse generating circuit in synchronism with a triggering pulse supplied to said range sweep of said indicator, said echo generating pulse circuit having means for variably delaying said synchronizing pulses giving said delayed pulses range intelligence, means for selectively gating said synchronizing pulses giving said pulses azimuthal intelligence, a range pulse generator for providing said delayed pulses with a steep voltage gradient prior to said gating means, means for synchronizing said gating means with said azimuthal sweep, and output means for supplying said intelligence pulses of said echo generating circuit to said indicator, said output means including an echo strength control circuit including a gas tube for critically controlling amplitude of said intelligence pulses.

2. In combination, a generating circuit for producing a signal simulating an echo pulse, a radar indicator having an azimuthal sweep and a range sweep, said generating circuit having means for recurrently supplying simultaneously first and second pulses in synchronism, said first pulses triggering said range sweep of said indicator, means for delaying said second pulses relative to said first pulses giving said second pulses a controlled range intelligence, means for selectively gating said second pulses giving said pulses controlled azimuthal intelligence, means for synchronizing said gating means with said azimuthal sweep of said radar indicator, and output circuit means for supplying said intelligence pulses to said indicator, including a gas tube in combination with a variable resistor for critically controlling amplitude of said intelligence pulses.

3. In combination, a synthetic echo pulse generating circuit and a radar indicator having an azimuthal sweep and a range sweep, means for recurrently supplying triggering pulses to said echo pulse generating circuit in synchronism with triggering pulses supplied to said range sweep of said indicator, said echo generating pulse circuit having means for selectively delaying said synchronizing pulses giving said pulses range intelligence including an azimuth gate comprising a capacitor switch for switching a signal comprising oppositely disposed electrodes forming capacitors and having plate like means arranged therebetween with relative movement between said electrodes and said plate, means in said plate like means for increasing the capacitance of said oppositely disposed electrodes when said means is positioned between said electrodes, said increase in capacitance between said electrodes producing selective transfer of said signal, means for selectively gating said synchronizing pulses giving said pulses azimuthal intelligence, unit circuit means for providing said delayed pulses with steep voltage gradient prior to said gating means, means for synchronizing said gating means with said azimuthal sweep, and output means for supplying said intelligence pulses of said echo generating circuit to said indicator.

4. In combination, a synthetic echo pulse generating circuit and a radar indicator having an azimuthal sweep and a range sweep, means for recurrently supplying triggering pulses to said echo pulse generating circuit in synchronism with triggering pulses supplied to said range sweep of said indicator, said echo generating pulse circuit having means for delaying said synchronizing pulses giving said pulses range intelligence, means for selectively gating said synchronizing pulses giving said pulses azimuthal intelligence, said gating means including a capacitor switch comprising oppositely disposed electrodes and having a plate like means with a dielectric insert movably positioned between said electrodes, means for synchronizing said gating means with said azimuthal sweep, and an output circuit including a gas filled tube for controlling the voltage amplitude of the output pulse by firing and a variable resistor for controlling the ionizing plate voltage of said gas tube and supplying said intelligence pulses of said echo generating circuit to said indicator.

5. In combination, a generating circuit for producing a signal simulating an echo pulse, a constant voltage power source and a radar indicator having an azimuthal sweep and a range sweep, said generating circuit having means for recurrently supplying simultaneously first and second pulses in synchronism, said first pulse triggering said range sweep of said indicator, variable delaying means for delaying said second pulses relative to said first pulses giving said second pulse a controlled range intelligence, means for selectively gating said second pulses giving said pulses controlled azimuthal intelligence, a range pulse generator for providing said second pulses with a steep voltage gradient prior to said gating means, said range pulse generator includes a gas tube circuit arrangement, means for synchronizing said gating means with said azimuthal sweep of said radar indicator, and output means for supplying said intelligence pulses to said indicator, said output means including a gas tube having a non-conducting plate voltage stabilized by said constant voltage power source and an extinguishing plate voltage, the voltage span between said non-conducting plate voltage and said extinguishing voltage being determinative of the amplitude of the output intelligence pulse, said voltage span being so large relative to said extinguishing voltage that variations in said extinguishing voltage have negligible effect on the critically set voltage amplitude of output intelligence pulses, said voltage amplitude of output intelligence pulses being set by means for varying said non-conducting plate voltage.

6. The combination of claim 5 wherein said means for selectively gating said second pulses giving said pulses controlled azimuthal intelligence includes a capacitor switch for selectively switching a signal comprising oppositely disposed switching electrodes forming capacitors and having a metallic sleeve with a circumferential portion movably positioned therebetween, dielectric means in said circumferential portion for increasing the capacitance of said oppositely disposed electrodes when said dielectric means is selectively positioned between said electrodes whereby, said increase in capacitance between said electrodes produces a selective transfer of said signal.

7. In combination, a synthetic echo pulse generating circuit and a radar indicator having an azimuthal sweep and a range sweep, means for recurrently supplying triggering pulses to said echo pulse generating circuit in synchronism with triggering pulses supplied to said range sweep of said indicator, said echo generating pulse circuit having means for delaying said synchronizing pulses giving said pulses range intelligence, means for selectively gating said synchronizing pulses giving said pulses azimuthal intelligence, means for synchronizing said gating means with said azimuthal sweep, and output means for supplying said intelligence pulses of said echo generating circuit to said indicator comprising gas tube circuit means and a constant voltage power source, said gas tube circuit means including a gas tube having an ionization voltage stabilized by said power source and an extinguishing plate voltage, voltage span between said ionization voltage and said extinguishing voltage being determinative of amplitude of said output pulse, said voltage span being so large relative to said extinguishing voltage that variations in said extinguishing voltage have small effect on said span, amplitude of said output voltage pulse being variable by manipulating means for varying said ionization plate voltage.

References Cited in the file of this patent

UNITED STATES PATENTS

| | | |
|---|---|---|
| 2,441,325 | Morrison | May 11, 1948 |
| 2,459,667 | Mason | Jan. 18, 1949 |
| 2,522,541 | Saxton et al. | Sept. 19, 1950 |
| 2,693,647 | Bolster et al. | Nov. 9, 1954 |
| 2,760,127 | Duncan | Aug. 21, 1956 |
| 2,781,511 | Pear | Feb. 12, 1957 |
| 2,790,168 | Connelly | Apr. 23, 1957 |
| 2,811,789 | Paine | Nov. 5, 1957 |
| 2,856,701 | Leskinen | Oct. 21, 1958 |